US011498791B2

(12) United States Patent
Rambusch et al.

(10) Patent No.: US 11,498,791 B2
(45) Date of Patent: Nov. 15, 2022

(54) METHOD AND APPARATUS FOR MAKING ADHESIVE TAPE

(71) Applicants: Peter Rambusch, Wuppertal (DE); Rene Rambusch, Wuppertal (DE); Kay Ruhnau, Wuppertal (DE)

(72) Inventors: Peter Rambusch, Wuppertal (DE); Rene Rambusch, Wuppertal (DE); Kay Ruhnau, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 357 days.

(21) Appl. No.: 16/639,276

(22) PCT Filed: Aug. 22, 2018

(86) PCT No.: PCT/EP2018/072646
§ 371 (c)(1),
(2) Date: Feb. 23, 2020

(87) PCT Pub. No.: WO2019/048232
PCT Pub. Date: Mar. 14, 2019

(65) Prior Publication Data
US 2020/0247635 A1 Aug. 6, 2020

(30) Foreign Application Priority Data
Sep. 5, 2017 (DE) .......................... 102017120419.9

(51) Int. Cl.
C09J 7/30 (2018.01)
B65H 18/10 (2006.01)
B26D 1/18 (2006.01)
C09J 7/00 (2018.01)
B26D 7/26 (2006.01)
B65H 23/032 (2006.01)

(52) U.S. Cl.
CPC .......... B65H 18/103 (2013.01); B26D 1/185 (2013.01); B26D 7/2635 (2013.01);
(Continued)

(58) Field of Classification Search
CPC .......... B65H 2301/5113; B65H 2301/515323; B65H 18/103; C09J 2301/204;
(Continued)

(56) References Cited

U.S. PATENT DOCUMENTS 4,460,634 A * 7/1984 Hasegawa ............... G09F 15/02
156/289
5,725,320 A * 3/1998 Austin ................... B26D 1/405
400/621

(Continued)

FOREIGN PATENT DOCUMENTS

| GB | 2523390 A | * | 8/2015 | ............ B26D 1/225 |
| WO | 2012167806 A | | 12/2012 | |
| WO | WO-2019048232 A1 | * | 3/2019 | ............ B26D 1/185 |

Primary Examiner — Leslie A Nicholson, III
(74) Attorney, Agent, or Firm — Andrew Wilford

(57) ABSTRACT

The subject matter of the present invention is a method and a device for producing an adhesive tape (1). First a material web (2) comprising a carrier tape material is supplied from an unwinding unit (3). The supplied material web (2) is subsequently provided on at least one surface with at least one adhesive strip (4) in a coating unit (6). The material web (2) provided with the adhesive strip (4) is then cut into at least two longitudinal strips with the aid of a cutting device (10) and made up into individual adhesive tapes (1). According to the invention, a sensor (8, 9) scanning the material web is used to align the material web (2) and/or the cutting device (10) in the transverse direction (Q) in such a way that a longitudinal cut (S) respectively produced with the aid of the cutting device (10) is introduced in an exact position into the material web (2).

9 Claims, 2 Drawing Sheets

Figure 1:
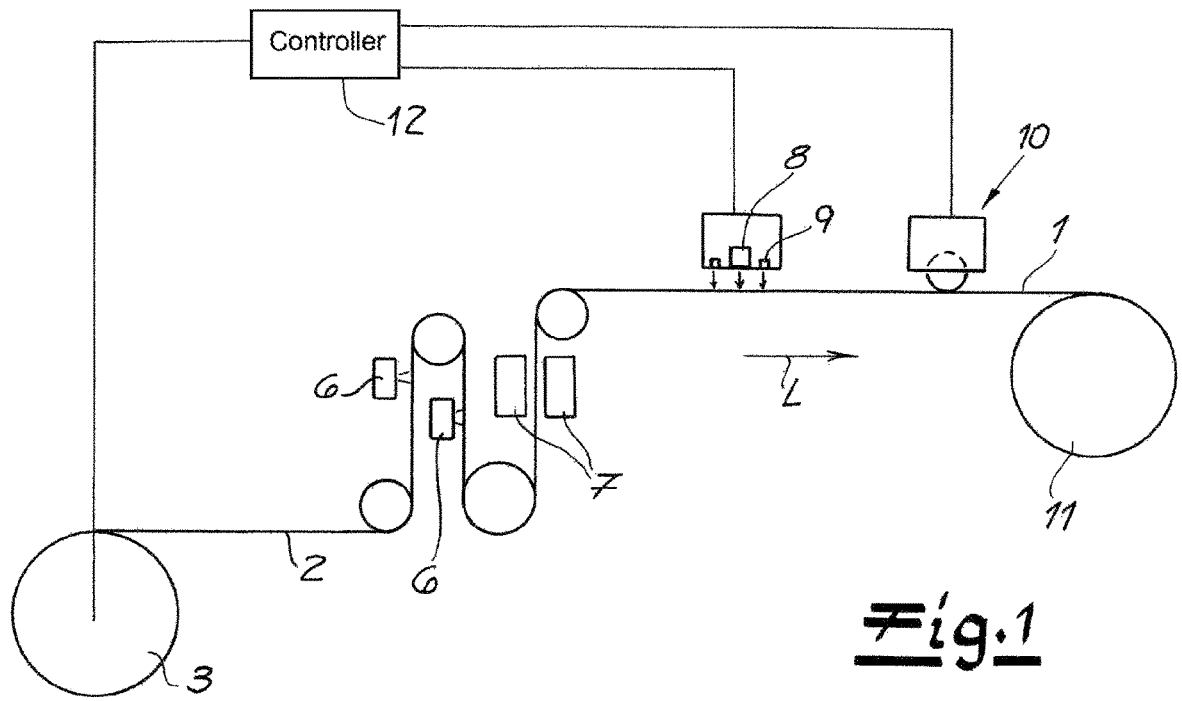

(52) U.S. Cl.
CPC ............ B65H 23/0326 (2013.01); C09J 7/00 (2013.01); *B65H 2301/4148* (2013.01); *B65H 2301/5113* (2013.01); *B65H 2301/515323* (2013.01); *B65H 2553/414* (2013.01); *C09J 2203/302* (2013.01); *C09J 2301/204* (2020.08)

(58) Field of Classification Search
CPC . C09J 2203/302; C09J 7/00; C09J 7/20; C09J 7/30; B26D 1/185; B26D 7/26; B26D 7/2628; B26D 7/2635; B05D 5/10
See application file for complete search history.

(56) References Cited

U.S. PATENT DOCUMENTS

| | | | |
|---|---|---|---|
| 5,730,354 A * | 3/1998 | O'Connor | B65D 75/68 493/923 |
| 6,394,330 B1 * | 5/2002 | Jackson | B65H 35/02 225/2 |
| 6,450,381 B1 * | 9/2002 | Ernst | B65H 23/038 226/185 |
| 7,615,128 B2 * | 11/2009 | Mikkelsen | D06H 7/00 156/356 |
| 9,222,002 B2 | 12/2015 | Meier | |
| 10,766,101 B2 * | 9/2020 | Rambusch | B23K 26/21 |
| 2001/0011574 A1 * | 8/2001 | Onishi | B26D 11/00 428/343 |
| 2003/0198806 A1 | 10/2003 | Samson-Himmerlstjerna | |
| 2004/0211904 A1 * | 10/2004 | Scowen | B65H 7/14 250/341.1 |
| 2005/0133648 A1 * | 6/2005 | Horiuchi | B65H 29/12 241/236 |
| 2007/0234862 A1 * | 10/2007 | Mikkelsen | D06H 7/00 83/438 |
| 2013/0273333 A1 | 10/2013 | Meier | |
| 2017/0066614 A1 | 3/2017 | Allen | |
| 2017/0246656 A1 * | 8/2017 | Allen | B65H 18/103 |

* cited by examiner

METHOD AND APPARATUS FOR MAKING ADHESIVE TAPE

CROSS REFERENCE TO RELATED APPLICATIONS

This application is the US-national stage of PCT application PCT/EP2018/072646 filed 22 Aug. 2018 and claiming the priority of German patent application 102017120419.9 itself filed 5 Sep. 2017.

The invention relates to a method of making an adhesive tape having the following method steps:
- a web strip is supplied from a substrate web by an unwinder;
- the supplied web strip is subsequently provided on at least one face with at least one adhesive strip by a coater.
- the web strip provided with the adhesive strip is then split by a cutter into at least two longitudinal substrips and made up into individual adhesive tapes.

A method and an associated apparatus of the form described at the outset is presented in detail, for example, in EP 2 744 865 [U.S. Pat. No. 9,222,002] of applicant. In this case, the glue or adhesive as a whole is applied contactlessly to the substrate web and the substrate web is then split longitudinally into individual adhesive tapes. At the coater for applying the adhesive strip, the substrate web is substantially guided vertically or nearly vertically. As a result, the adhesive strip can be applied to the substrate web, and a so-called "straying" in particular is minimized or completely prevented.

The adhesive tapes produced in this way are designed differently or may be configured differently. Thus, a distinction is made in practice between adhesive tapes for left-hand winding and those for right-hand winding. The adhesive tape in question is in each case helically wound around electrical cables to be assembled and wrapped in order to be able to produce a set of cables or a cabling harness for automobile applications. This has proven effective in principle.

Something comparable is described in EP 2 627 539 [US 2013/0273333] of applicant. At this point a special trimming of the strip or its face has been carried out. This produces an especially flexible overwrapping of the cable to be assembled and a fabric substrate that is especially media-resistant, and in particular without having to apply an additional coating. Also in this case, adhesive tapes, generally speaking, are produced from longitudinally split strip material and then are wrapped around cable in the wrapping direction to produce a cabling harness. It is then possible to distinguish again between adhesive tapes for left-hand winding and those for right-hand winding.

Last, WO 2002/018509 [US 2017/0066614] relates to a method of wrapping longitudinally extending cable sets with an adhesive tape. The adhesive tape here is guided around the longitudinally extended product in a spiral or helix. On at least one side of the substrate strip of the adhesive tape, the adhesive is applied in the longitudinal direction in the form of a band that is narrower than the substrate strip of the adhesive tape.

The prior art has basically proven itself effective when it comes to providing a web strip made of a substrate web with one or more adhesive strips and then making it up in the longitudinal direction into adhesive tapes. However, in the generic prior art corresponding to EP 2 744 865, different adhesive tapes are typically produced at this point, most often those for left-hand winding and those for right-hand winding. With respect to easy handling, logistics and processing, there is room for improvement here.

Moreover, in the further prior art corresponding to EP 2 627 539 an overlapping region among other things is used. This removes the exact positioning of the adhesive strip on the finished adhesive tape. Because the longitudinal cut of the web strip provided with the respective adhesive strips and supplied is accomplished, generally speaking, using rotating knives, for example of a cutter bar, such as is described, for example, in EP 2 744 865, deviations of the position of the adhesive strip relative to the edge of the adhesive tape at this point are in practice not prevented. This is because such deviations appear, for example, if the substrate web is of differing elongation and/or moves transversely as it is passing through. The invention is intended to provide a comprehensive remedy for this situation.

The object of the invention is to further develop a method of this type and an associated apparatus in such a way that the logistics and processing are simplified and the adhesive strip of the adhesive tape has a defined position with respect to the substrate in a reproducible manner.

To resolve this technical problem, a generic method of making an adhesive tape of the type described above is characterized within the context of the invention in that, before or during the cutting operation and after application of the adhesive strip, a sensor scanning the web strip is used to align the web strip and/or the cutter in the transverse direction in such a way that a longitudinal cut produced by the cutter is introduced in an exact position into the web strip.

The design is applied in detail such that the sensor scans the web strip for differences in contrast. The differences in contrast are different light reflections of, on the one hand, the (uncoated) adhesive-free one face of the web strip and, on the other hand, the adhesive strip, usually in the visible spectral range.

This means the sensor picks up, on the one hand, the adhesive-free web strip and, on the other hand, the adhesive strip or the associated light reflections. A difference in contrast can be deduced from different light reflections of the adhesive-free face and of the adhesive strip, and as a result the exact position of the adhesive strip, and in particular its edge profile in relation to the web strip passing through in the longitudinal direction or to the edge of the web strip can be exactly determined and gauged. Whether or not the adhesive-free face of the web strip even has a coating ultimately plays no role here. What is uniquely and solely critical is a sufficient contrast between the adhesive-free face of the web strip and the adhesive strip as such, and in particular with respect to light reflections. In this connection, the invention starts from the knowledge that light cast, for example, on the web strip is reflected differently, and in particular from the adhesive-free face of the web strip, on the one hand, and, on the other hand, from the adhesive strip.

In this connection, visible light, which can be in the long-wave red range, is generally used, because the web strip is formed, for example, of black fabric. Of course white light or short-wave visible light can also be used at this point. It is also possible in principle to work in the non-visible range of the electromagnetic spectrum, for example, with invisible infrared light that is directed onto the web strip and is reflected differently, on the one hand by the adhesive-free face and on the other hand by the adhesive strips, and is evaluated by the sensor.

One way or the other, the sensor can gauge the topological profile of the adhesive strip on the face of the web strip based on the differences in contrast between, on the one hand, the adhesive-free face of the web strip and, on the other hand, the adhesive strip, and metrologically determine, for example, a spacing between the edge of the adhesive strip and the edge of the web strip, that is, the edge profile.

Usually, the procedure is that the sensor determines a topological edge profile of the adhesive strip on the web strip from the differences in contrast between the adhesive-free face of the web strip and the adhesive strip and specifies this edge profile for further processing. This is generally realized and implemented by a controller evaluating the signals of the sensor. From this, the web strip and/or the cutter can be moved in the transverse direction.

Moreover, the procedure is usually such that the longitudinal cut formed in the web strip provided with the adhesive strip, where applicable, is made in the web strip taking into account a predetermined minimum spacing from the edge of the band or of the adhesive strip. The signals for the edge profile of the adhesive strip that are transmitted from the sensor in question to the controller function here as a control variable for an adjustment displacement of the web strip and/or of the cutter in the transverse direction.

The edge profile of the adhesive strip and, consequently, the control variable thus reacts to itself in the manner of a circuit structure and negative feedback. This means, depending on the measured edge profile and, consequently, the control variable, if the web strip and/or the cutter is moved correspondingly in the transverse direction, a previously specified edge profile, for example, is set and maintained. Depending on the deviation of the edge profile actually measured by the sensor from the specified edge profile, the controller ensures an appropriate adjusting movement to the end that the web strip and/or the cutter is/are moved in the transverse direction.

Normally, the web strip makes the adjusting movement takes place and in particular in the web strip acted on by an actuator in order to complete the desired movement in the transverse direction. In principle, the cutter can also be moved. However, because at this point a cutter bar having a plurality of cutting knives rotatably mounted on the cutter bar is used, the cutter or the cutter bar is generally designed to be stationary, whereas the actuator is used for transversely moving the web strip. To this end, the unwinder supplying the web strip can advantageously be provided with the relevant actuator. The subject matter of the invention is also an apparatus for the manufacture of an adhesive tape that is advantageously suited for performing the previously described method and is described below in detail in claim 8 and the following.

In the result, a method and an associated apparatus for making an adhesive tape are presented that can be used to gauge and predetermine the exact position and the exact edge profile of the adhesive strip on the adhesive tape produced and made up in such a way. In this way, the invention offers the possibility of providing exactly identical adhesive tapes on the output side of the apparatus according to the invention that can be used, for example, either for left-hand winding or for right-hand winding in a helical winding operation for making a cable harness as is known in the prior art and was previously adequately described. As a consequence thereof, the logistics as a whole are simplified and adhesive tapes can be reproducibly provided for the first time with adhesive strips that are exactly manufactured and consequently are predestined for the subsequent wrapping of cables to form cable sets or cabling harnesses.

In principle, the adhesive tapes produced in such a way can of course also wrap around cables to be assembled as part of a longitudinal wrapping. As a rule, the adhesive tapes produced according to the previously described method are, however, helically wrapped around the cable in question to complete desired cabling harness. The essential advantages are to be seen herein.

Figure 2:
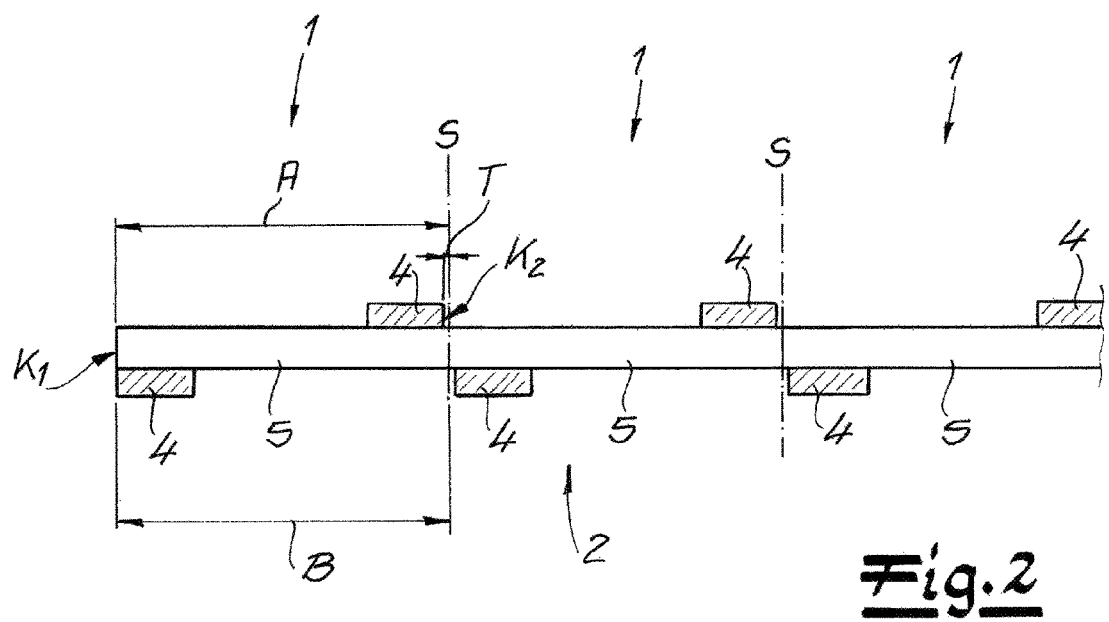
Figure 3:
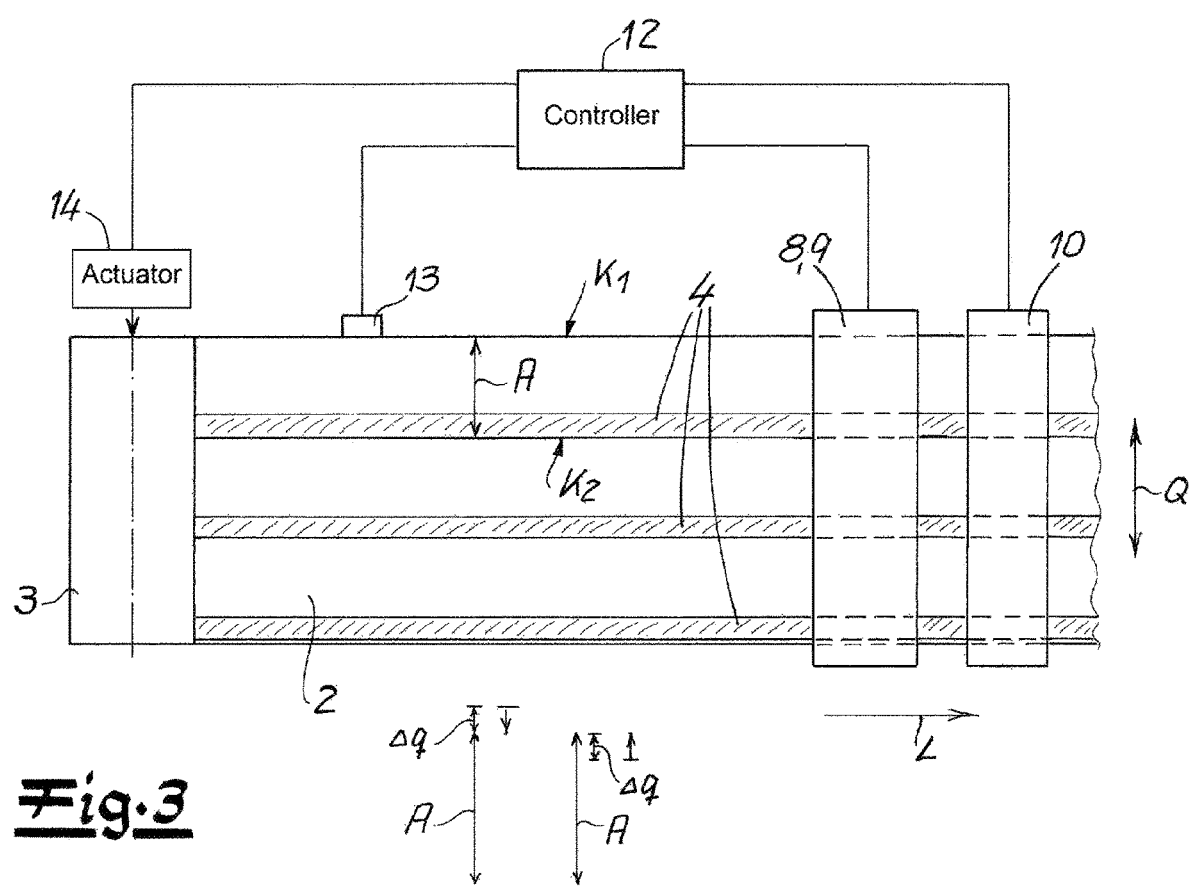

The invention is explained in detail below in reference to a drawing representing only one embodiment in which:

FIG. 1 is an overview of an apparatus according to the invention for producing an adhesive tape, FIG. 2 is a schematic cross section through the substrate web as part of the production of the individual adhesive tapes and FIG. 3 is a detail view of the apparatus of FIG. 1.

The drawing shows an apparatus for making an adhesive tape 1. Based on the sectional view of FIG. 2, it is recognized that, by way of non-limiting example, three adhesive tapes 1 are produced from one web strip 2 that is supplied by an unwinder 3. The individual adhesive tapes 1 are each provided at each edge with a respective adhesive strip 4.

Based on the sectional view in FIG. 2, it is evident that the adhesive strips 4 in question are at the edges of substrips 5 of the relevant adhesive tape 1. The substrips 5 are separated at longitudinal cuts S indicated in FIG. 2 from the web strip 2 supplied in the longitudinal direction L. Moreover, the design is made in such a way that the adhesive strips 4 extend inward the substrip edge toward a center of the band and one adhesive strip 4 is applied to the lower face and the other adhesive strip 4 to the upper face of each the substrip 5 to form identical adhesive tapes 1.

According to the nonlimiting embodiment, the two adhesive strips 4 are identical and have widths that, compared to an overall width B of the adhesive tape 1 produced in such a manner, amounts to or can amount to approximately 20% to 50% of this overall width B. Each adhesive strip 4 is applied by with a coater 6 to the web strip 2. To do this, the web strip 2 starting from the unwinder 3 first moves past a first coater 6 for its one face and thereafter past an additional coater 6 for the other face. Of course, it is also possible to work with only a single coater 6, and specifically for the case that the web strip 2 is provided on only one face with a plurality of adhesive strips 4.

The coater 6 for providing the web strip 2 on at least one face with the adhesive strip 4 or the plurality of parallel adhesive strips 4 is such that, it applies the respective adhesive by direct coating on the web strip 2 by means of a nozzle. To this end, the liquid adhesive is pressed through a fishtail nozzle, for example. Each of the adhesive strips 4 shown in FIG. 2 is thus made by a separate respective nozzle, or the adhesive strips 4 can also be applied on one face of the web strip 2 also by a single nozzle with discontinuities.

The web strip 2 is a fabric web, in particular a polyester fabric, but not limited to such. In principle, the web strip can also be a film web, laminate, paper web, etc. According to this embodiment, the web strip 2 is made of polyester fabric constructed from dyed warp and weft threads. Accordingly, the substrip 5 of the adhesive tape produced in such way is a polyester fabric substrate.

Actually, the warp and weft threads in question in the described example might be solution dyed and have a very consistent color, for example black. This applies, of course, only as an example, and the threads in question can even be dyed orange or another color. Following the coater 6 or the two coaters 6 for the web strip 2 in FIG. 1 is, in the processing direction indicated by an arrow or in the longitudinal direction L of the web strip 2, a cross-linker 7. The cross-linker 7 in the example has UV lamps or UV LEDs used to cross-link the adhesive strips 4 applied to the respective faces of the web strip 2 as needed. This means that the cross-linker 7 in this case is to be understood as an option.

Within the context of this embodiment, the cross-linker 7 is formed with a bifurcated assignment to the respective face of the web strip 2. This can be attributed to the fact that, according to this embodiment, both faces of the web strip 2 are equipped with respective adhesive strips 4. Of course, such a bifurcation is superfluous if only one face of the web strip 2 has adhesive strips 4, which is not shown in this case.

In the processing direction or longitudinal direction L of the web strip 2, the overview drawing according to FIG. 1 first shows a sensor 8, 9 whose function and form are explained in detail below. Following the sensor 8, 9 is a cutter 10 that is used to split the band longitudinally as shown in FIG. 2 or make longitudinal cuts S in the web strip 2. For this purpose, the cutter 10 as a whole has a cutter bar that is suitable and provided for mounting knife disks that rotate about a transverse axis, as is shown and described in the prior art according to EP 2 744 865 for example.

Finally and downstream of the cutter 10, the individual adhesive tapes 1 are packaged and can be received or wound up for example on a winder 11. As already explained, the web strip 2 is one in which a polyester fabric web is supplied as the substrate web. Alternatively or additionally, the web strip 2 can also be a fleece web, a film web, a paper web or combinations thereof.

The sensor 8, 9 is used to scan the web strip 2. To do this, the sensor 8, 9 is provided and placed above a face of the web strip 2. According to this embodiment and not limited thereto, the upward facing face of the web strip 2 with the adhesive strip 4 is scanned, which of course is only considered an example. Actually, the sensor 8, 9 can as a whole output signals to a controller 12 that, as shown by the representation corresponding to the top view in FIG. 3, correspond to a topological edge profile A; $K_1$, $K_2$ of the respective adhesive strip 4. The topological edge profile A; $K_1$, $K_2$ of the adhesive strip 4 should be understood in the context of the view of FIG. 3 and of this embodiment as a transverse spacing A between two longitudinal edges $K_1$, $K_2$ and the associated values for the transverse spacing A in the longitudinal direction L of the web strip 2.

The edge $K_1$ according to this embodiment in FIG. 3 is the left edge of the web strip 2 in the feed direction or longitudinal direction L. The edge $K_2$, on the other hand, designates the right edge of the adjacent adhesive strip 4 next to the edge $K_1$ of the web strip 2 in the running direction or longitudinal direction L. The topological edge profile A; $K_1$, $K_2$ then reflects the values for the transverse spacing A between the two edges $K_1$ and $K_2$, and specifically as a function of the position of the web strip 2 in the longitudinal direction L.

Signals representing the individual values for the transverse spacing A dependent on the longitudinal direction L are fed into the controller 12 by the sensor 8, 9. Actually, the progression of $K_2$ can be determined using the sensor 8, 9. By contrast, by a further sensor 13, the shape of the edge $K_1$ of the web strip 2 is determined and transmitted to the controller 12. From the two values for the positions of the edges $K_1$, $K_2$ depending on their position compared to the longitudinal direction L of the web strip 2, the controller 12 can determine the previously described topological edge profile A; $K_1$, $K_2$.

To this end, the sensor 8, 9 is equipped first of all in such a way that it can scan the web strip 2 for differences in contrast. The differences in contrast are different values for light reflection off, on the one hand, the adhesive-free face of the web strip 2 and, on the other hand, the adhesive strips 4. For this purpose, the sensor 8, 9 in this embodiment is provided with a camera 8 and a light source 9 surrounding the camera 8. The light source 9 in this case is LEDs that surround the camera 8, for example in an annular configuration, and in this case output long-wave light in the visible spectrum, for example red light.

This red light of the light source 9 is reflected differently by the web strip 2. Actually, the web strip 2 itself is substantially opaque on its adhesive-free face next to the adhesive strip 4 and therefore has only a slight light reflection. By contrast, the adhesive strip 4 ensures an increased light reflection in the visible range that can typically be attributed to its "silvery character." In any event, the sensor 8, 9 can draw conclusions from these differences in contrast concerning the profile of the right edge $K_2$ of the examined adhesive strip 4 in the feed or longitudinal direction L. In conjunction with the associated values that are determined by the other sensor 13 for the profile of the edge $K_1$ of the web strip 2 in this region, it is possible to transmit the transverse spacing A as a whole between the two edges $K_1$, $K_2$ depending on the position of the web strip 2 to the controller 12 and evaluate them here.

The invention starts here as a whole from a plurality of discoveries. First of all, the web strip 2 as a whole has a consistently equal width, so that fluctuations of the previously mentioned transverse spacing A are uniquely and solely attributable to movement of the web strip 2 in the transverse direction Q indicated in FIG. 3. Moreover, the coater 6 applying the adhesive strips 4 to the web strip 2 is designed such that the individual adhesive strips 4 shown in FIG. 3 have a consistent transverse spacing from each other. This is because at this point work is done as a whole with nozzles for the dispensing of the adhesive that are arranged and mechanically fixed relative to each other at fixed transverse spacings from each other in the coater 6. As a consequence, the transverse spacing A between the left edge $K_1$ of the web strip 2 in the c direction or longitudinal direction L and the right edge $K_2$ of the adhesive strip 4 adjacent to the edge $K_1$ can as a whole serve and be used as a measure of how large any displacement Δq of the web strip 2 in the transverse direction Q during the passage through the apparatus according to FIG. 1 is.

Actually, the controller 12 is currently a feedback controller 12. Moreover, the transverse spacing A in question or as a whole the topological edge profile A; $K_1$, $K_2$ functions as a control variable. To this end, a target value for the transverse spacing A in question may be specified in the controller 12 working with or without feedback. If, for example, the actually measured width deviates by the amount Δq from the target value A, in other words, if the sensor 8, 9, in conjunction with the sensor 13, at the examined position of the web strip 2 measures a value of A+Δq, the controller 12 in this embodiment ensures that the web strip 2 is repositioned or aligned in the transverse direction. This demonstrably corresponds to the enlarged view of FIG. 3 in this case to the fact that an actuator 14 for the unwinder 3 that is connected to the controller 12 in the case of the example is moved to the right in the transverse direction Q relative to the feeding direction or the longitudinal direction L, as an arrow associated with this situation indicates.

If the sensor 8, 9, by contrast measures a transverse spacing A that is Δq less than specified by the target value A, an appropriate movement of the unwinder 3 by the actuator 14 in the opposite direction corrects for this, which means in this case in the feeding direction or the longitudinal direction L toward the left in transverse direction Q. This is likewise indicated by an arrow.

In this way, the web strip 2 in this embodiment before or even during the cutting operation is aligned in the transverse direction Q by the cutter 10 and after the provision of the web strip 2 with the adhesive strip 4 by the sensor 8, 9 scanning the web strip 2. The alignment in the transverse direction Q of the web strip 2 is effected such that a longitudinal cut or the plurality of longitudinal cuts S produced by the cutter 10 is/are each introduced in an exact position into the web strip 2 as shown in FIG. 2.

As already explained, for this purpose the web strip 2 is examined for differences in contrast between the adhesive-free face and the respective adhesive strip 4. The described contrast differences that are evaluated by the sensor 8, 9, thus correspond to different light reflections from, on the one hand, the adhesive-free face and, on the other hand, the adhesive strip 4. From these contrast differences, the sensor 8, 9 determines the topological edge profile A; $K_1$, $K_2$ of the relevant adhesive strip 4 on the web strip 2.

In order to compensate for deviations Δq in the transverse direction Q from a target value for the transverse spacing A, the web strip 2, namely the unwinder 3, is moved in this embodiment in the transverse direction Q. For this purpose, the unwinder 3 is connected to the actuator 14 can move it in the transverse direction Q of the web strip 2.

Beyond that, the fundamental possibility exists of introducing the longitudinal cut S shown in FIG. 2 in the web strip 2 on the edge of the associated adhesive strip 4, where applicable taking into account a predetermined minimum spacing T from the relevant edge $K_2$ of the adhesive strip 4. This minimum spacing T ensures that, when the rotating knives of the cutter 10 cut through, they do not come into contact with the respective adhesive strips 4. This applies of course only as an example and is not absolutely necessary.

In any case, the signals transmitted from the sensor 8, 9 to the controller 12 are used for locating the edge $K_1$ of the web strip 2 as a whole as well as the edge $K_2$ of the at least one examined adhesive strip 4. Of course, it is within the scope of the invention to detect all adhesive strips 4 on the face of the web strip shown in FIG. 3 by the sensor 8, 9. Then an averaging of the respective edge profile $K_2$ of the associated adhesive strip 4 can be carried out, for example, in the controller 12.

Because as a rule the adhesive strips 4 are applied with a fixed spacing from each other on the face of the web strip 2 by the respective coater 6, such a measurement of a plurality of adhesive strips 4 is, strictly speaking, not required, even though it is possible. In principle, the apparatus and the method can operate continuously. However, a discontinuous operation is also possible, but is not shown.

The invention claimed is:

1. A method of making an adhesive tape comprising the following method steps:
    1.1) an unwinder supplying a web strip from a substrate-web supply;
    1.2) a coater subsequently applying a plurality of adhesive strips to one face of the supplied web strip;
    1.3) thereafter a cutter longitudinally splitting the web strip provided with the adhesive strip into at least two longitudinal substrips each carrying a respective adhesive strip, thereby making individual adhesive tapes;
    1.4) before or during step 1.3) and after step 1.2), a sensor scanning the web strip to determine a transverse position of the adhesive strips on the web strip; and
    1.5) transversly shifting and thereby aligning the web strip and the the unwinder in the transverse direction to move the web strip without moving the cutter in such a way that a longitudinal cut produced by the cutter is introduced in an exact transverse position relative to the adhesive strip into the web strip.

2. The method according to claim 1, wherein the sensor scans the web strip for differences in contrast.

3. The method according to claim 2, wherein the differences in contrast are different light reflections from the adhesive-free face of the web strip and the adhesive strip.

4. The method according to claim 3, further comprising the step of:
    from the contrast differences between the adhesive-free face of the web strip and the adhesive strip, the sensor in conjunction with a controller evaluating a signal from the sensor to determine a topological edge profile of the adhesive strip on the web strip.

5. The method according to claim 1, wherein the produced longitudinal cut is introduced into the web strip at an edge of the adhesive strip or at a minimum spacing from the edge of the adhesive strip.

6. The method according to claim 4, further comprising the step of:
    the sensor transmitting signals representing the edge profile to the controller of the adhesive strip as a control variable for an adjusting movement of the web strip and/or of the cutter in the transverse direction.

7. An apparatus for making an adhesive tape, the apparatus comprising:
    an unwinder that supplies a web strip from a substrate web;
    a coater for providing the web strip on a face with a adhesive strip;
    a cutter that splits the web strip provided with the adhesive strip into two longitudinal substrips that ultimately are made into the adhesive tape;
    an actuator connected to the unwinder for transversely shifting the web and unwinder relative to the cutter and without moving the cutter;
    a sensor that scans the web strip and generates signals representing a transverse position of the adhesive strips on the web strip;
    a controller connected to the actuator and to the sensor for receiving the signals and transversely shifting and thereby aligning the web strip and the unwinder in the transverse direction to move the web strip in order to form at least one longitudinal cut s in the web strip in an exact position in the web strip by the cutter without transversely moving the cutter.

8. The apparatus according to claim 7, wherein the sensor is an optical sensor that scans differences in contrast of the web strip within the visible spectrum.

9. The apparatus according to claim 8, wherein the optical sensor has a camera.

* * * * *